United States Patent [19]

Hasegawa et al.

[11] 4,160,160
[45] Jul. 3, 1979

[54] CIRCUIT FOR INTEGRATING A QUANTITY OF LIGHT IN AN AUTOMATIC CONTROL TYPE FLASH UNIT

[75] Inventors: Hiroshi Hasegawa, Tokyo; Yoshiaki Ohtsubo, Kawasaki; Sakuji Watanabe, Yono, all of Japan; Kouichi Takahata, deceased, late of Tokyo, Japan, by Kosaku Takahata, legal successor

[73] Assignee: Nippon Kogaku K.K., Tokyo, Japan

[21] Appl. No.: 798,835

[22] Filed: May 20, 1977

[30] Foreign Application Priority Data

May 28, 1976 [JP] Japan .................................. 51-61935

[51] Int. Cl.² ............................ G01J 1/46; G03B 7/08
[52] U.S. Cl. .................................. 250/214 P; 315/151; 354/30; 354/60 F; 354/128
[58] Field of Search .................... 315/151, 159, 241 P; 354/27, 29, 30, 33, 60, 128, 145; 250/211 J, 214 R, 214 P

[56] References Cited

U.S. PATENT DOCUMENTS

| 3,823,318 | 7/1974 | Krause | 250/214 P |
| 3,885,880 | 5/1975 | Tsunekawa et al. | 250/214 P X |

Primary Examiner—Eugene R. LaRoche
Attorney, Agent, or Firm—Fitzpatrick, Cella, Harper & Scinto

[57] ABSTRACT

A circuit for integrating a quantity of light in an automatic control type flash unit having flash means for providing flash illumination comprises light responsive means, an amplifier circuit, a high-pass filter, a voltage-current conversion circuit and a capacitor. The light responsive means receives light resulting from the flash illumination and converts the received light into a corresponding electrical signal. The amplifier circuit puts out the electrical signal as an amplified voltage. This circuit also puts out DC and low frequency error voltages. The high-pass filter eliminates DC and low frequency error voltages from the voltage put out by the amplifier circuit and puts out only the voltage corresponding to the electrical signal. The conversion circuit puts out a current corresponding to the voltage put out by the high-pass filter. The capacitor is charged with the current from the voltage-current conversion circuit. The charging voltage of the capacitor assumes a value which is the result of integration of the intensity of the light received by the light responsive means.

3 Claims, 2 Drawing Figures

CIRCUIT FOR INTEGRATING A QUANTITY OF LIGHT IN AN AUTOMATIC CONTROL TYPE FLASH UNIT

BACKGROUND OF THE INVENTION

1. Field of the Invention

This invention relates to a circuit for integrating a quantity of light in an automatic control type flash unit.

2. Description of the Prior Art

The automatic control type flash unit performs the following functions:

(1) receiving, by a photodiode, light reflected from an object illuminated by a flash discharge tube;

(2) charging a capacitor with a current corresponding to the quantity of light entering the photodiode; and (3) stopping the flashing of the flash discharge tube when the charging voltage of the capacitor has reached a predetermined value.

Usually, the quantity of light entering the photodiode is so great that the capacitor can be directly charged with the photocurrent from the photodiode. However, in special cases where the photodiode is contained within a camera body, the quantity of light entering the photodiode becomes smaller and it is therefore necessary to amplify the output of the photodiode. Unfortunately, an amplifier circuit usually has a disadvantage that it has in itself such error factors as voltage offset, temperature drift of bias current, etc. and these error factors appear at the output of the amplifier circuit. Therefore, mere amplification of the photodiode output by the amplifier circuit would be insufficient in that the error factors possessed by the amplifier change the point of time for stopping the flashing, thus preventing proper control of film exposure to be accomplished.

SUMMARY OF THE INVENTION

The present invention has, for its object, to eliminate the influence of the error factors such as voltage offset, temperature drift of bias current, etc. possessed by an amplifier circuit used when the quantity of light entering a photodiode is small, and thereby provide a circuit for integrating the quantity of light which is capable of accomplishing proper integration of the quantity of light.

According to the present invention, the circuit for integrating the quantity of light in an automatic control type flash unit having flash means for providing flash illumination comprises light responsive means positioned for receiving light resulting from the flash illumination and for converting the received light into a corresponding electrical signal, an amplifier circuit for putting out the electrical signal as an amplified voltage, which amplifier circuit also puts out DC and low frequency error voltages, a high-pass filter for eliminating the error voltages from the voltage put out by the amplifier circuit and for putting out only the voltage corresponding to the electrical signal, a voltage-current conversion circuit for putting out a current corresponding to the voltage put out by the high-pass filter, and a capacitor charged with the current from the voltage-current conversion circuit, the charging voltage of the capacitor assuming a value which is the result of integration of intensity of the light received by the light responsive means.

The invention will become more fully apparent from the following detailed description thereof taken in conjunction with the accompanying drawings.

DESCRIPTION OF THE PREFERRED EMBODIMENTS

Figure 1:
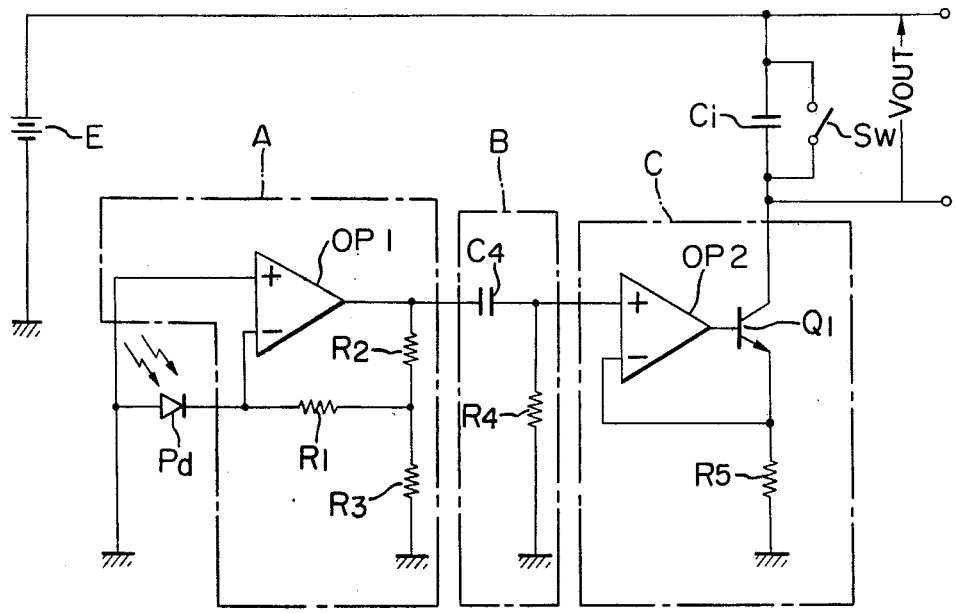
FIG. 1 diagrammatically shows the circuit for integrating the quantity of light as it is used with the terminals of the photodiode being short-circuited.

Referring to FIG. 1 which is a circuit diagram showing an embodiment of the present invention, a battery E is a power source for operating the circuit. A photodiode Pd rendered into short-circuited state by an operational amplifier OP1, receives the light reflected from an object illuminated by the flashlight from a flash discharge tube, not shown. Upon reception of the reflected light from the object, the photodiode Pd generates therein a flow of photocurrent proportional to the intensity of the light received. The photocurrent flowing through the photodiode Pd is converted into a voltage and amplified by a well-known amplifier circuit A comprising an operational amplifier OP1 and resistors R1, R2, R3. On the other hand, in the operational amplifier OP1 forming the amplifier circuit, voltages attributable to voltage offset, temperature drift of bias current, etc. (hereinafter referred to as the error voltages) are generated as error factors. These voltages appear at the input side of the amplifier, so that they are amplified with the voltage corresponding to the current flowing through the photodiode Pd (hereinafter referred to as the signal voltage). Therefore, the voltage at a point M which is the output terminal of the amplifier equals the signal voltage plus the error voltages. The error voltage consist of DC voltage attributable to the voltage offset and AC voltage of low frequency attributable to the temperature drift of bias current. On the other hand, the signal voltage is an AC voltage of several kilo Hz. Therefore, it is possible to separate only the signal voltage from the voltage at the point M by the use of a filter. A high-pass filter B for such purpose is formed by a capacitor C4 and a resistor R4. The signal voltage so separated by the high-pass filter B from the error voltages is applied to the non-inversion input terminal (+ terminal) of an operational amplifier OP2 which is the input terminal of a well-known voltage-current conversion circuit C comprising the operational amplifier OP2, transistor Q1 and resistor R5. An integrating capacitor Ci is charged with the current from the voltage-current conversion circuit C and a voltage proportional to the quantity of light received by the photodiode Pd is generated as the terminal voltage Vout of the integrating capacitor. A switch Sw provided in parallel to the integrating capacitor Ci is normally opened and adapted to be closed, when necessary, to discharge therethrough the charge stored in the capacitor.

Figure 2:
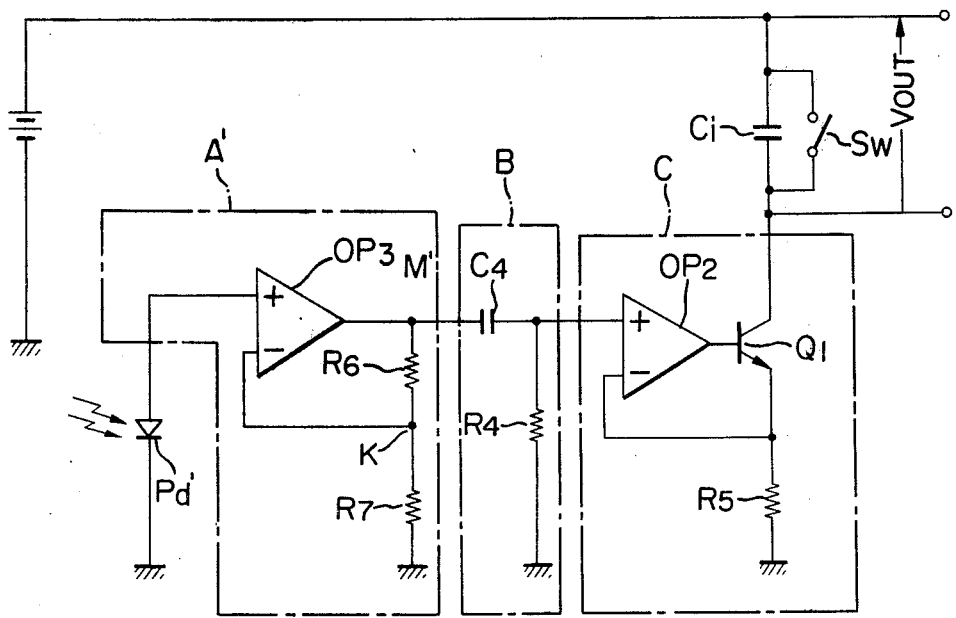
FIG. 2 diagrammatically shows the circuit for integrating the quantity of light as it is used with the terminals of the photodiode being opened.

In the embodiment described above, the photodiode Pd is used in its short-circuited state and the photocurrent proportional to the intensity of the light received by the photodiode Pd provides the input signal to the amplifier A, but alternatively, as shown in FIG. 2, the photodiode Pd may be used in its open state and the photovoltage proportional to the quantity of light received by the photodiode Pd may be used as the input signal to an amplifier A'.

In FIG. 2, assume that the light reflected from the object enters a photodiode Pd' to generate a voltage V' between the terminals of the photodiode Pd'. Then, the inversion input terminal (+) and the non-inversion input terminal (−) of an operational amplifier OP3 must be at the same potential, so that the potential at the junction K between two resistors R6 and R7 connected between the output terminal M' of the operational amplifier OP3 and the ground assumes V'. Therefore, a voltage of $(R_6+R_7/R_7)$. V' is generated at the output terminal M' of the operational amplifier OP3. The output terminal M' of the operational amplifier OP3 is the output terminal of the amplifier A' and connected to the input terminal of the filter B. In the other points, the circuit of FIG. 2 is similar to the circuit of FIG. 1 and need not be described further.

The reason why the filter B is connected between the amplifier A and the voltage-current conversion circuit C, as described, will now be explained. If the compensation circuit were contained in the amplifier A itself, the circuit would be so much complex that the response of the circuit would be slower and the circuit output would fail to respond to any variation in quantity of light. It is therefore desirable that the amplifier A be simple in construction to quicken the response to input signal.

There would also be a method whereby the filter B is omitted so that the error factors attributable to the amplifier A may be eliminated from the output current of the voltage-current conversion circuit C, but such method would be practically disadvantageous in that the circuit is not so simple as shown in the illustrated embodiment.

According to the present invention, as has hitherto been described, the influence of the voltage offset, temperature drift, etc. possessed by the amplifier circuit can be eliminated and thus, the current charging the capacitor for integrating the quantity of light assumes a value related only to the photoelectric conversion signal, thereby ensuring accurate integration of the quantity of light. Accordingly, the present invention enables proper control of exposure to be accomplished during the flash photography using an automatic control type flash unit.

What we claim is:

1. A circuit for integrating a quantity of light in an automatic control type flash unit having flash means for providing flash illumination, comprising:
   light responsive means positioned for receiving light resulting from the flash illumination and for converting the received light into a corresponding electrical signal;
   an amplifier circuit for amplifying said electrical signal and generating an output voltage which consist of a signal component corresponding to the amplified electrical signal and an error component corresponding to DC and low frequency error voltages;
   a high-pass filter for eliminating said error voltages from the output voltage of said amplifier circuit and for putting out only the voltage corresponding to said electrical signal;
   a voltage-current conversion circuit for putting out a current corresponding to the voltage put out by said high-pass filter; and
   a capacitor charged with the current from said voltage-current conversion circuit, whereby the charging voltage of said capacitor assumes a value which is the result of integration of the intensity of the light received by said light responsive means.

2. A circuit according to claim 1, wherein said amplifier circuit includes an operational amplifier having an inversion input terminal, a non-inversion input terminal and an output terminal.

3. A circuit according to claim 2, wherein said light responsive means is a photodiode having its anode connected to a common terminal and the non-inversion input terminal of said operational amplifier and its cathode connected to the inversion input terminal of said operational amplifier, said amplifier circuit includes two resistors connected in series between the output terminal of said operational amplifier and said common terminal, and a feedback resistor connected between the junction of said two resistors and the inversion input terminal of said operational amplifier, and said high-pass filter comprises a capacitor having one end connected to the output terminal of said operational amplifier and the other end providing the output terminal of said high-pass filter, and a resistor connected between the other end of said capacitor and said common terminal.

* * * * *